(12) United States Patent
Moulthrop et al.

(10) Patent No.: US 7,020,435 B2
(45) Date of Patent: Mar. 28, 2006

(54) ELECTRONIC TEST ANSWER RECORD IMAGE QUALITY IMPROVEMENT SYSTEM AND METHOD

(75) Inventors: Scott Moulthrop, Converse, TX (US); Tom Reznick, San Antonio, TX (US); Lois L. Barth, San Antonio, TX (US); David K. Boyd, San Antonio, TX (US)

(73) Assignee: Harcourt Assessment, Inc., San Antonio, TX (US)

( * ) Notice: Subject to any disclaimer, the term of this patent is extended or adjusted under 35 U.S.C. 154(b) by 127 days.

(21) Appl. No.: 10/459,878

(22) Filed: Jun. 12, 2003

(65) Prior Publication Data

US 2004/0253573 A1   Dec. 16, 2004

(51) Int. Cl.
*G09B 7/00* (2006.01)
(52) U.S. Cl. .................. 434/354; 434/322; 434/353
(58) Field of Classification Search ................ 434/353, 434/359, 358, 362, 363, 355
See application file for complete search history.

(56) References Cited

U.S. PATENT DOCUMENTS

| | | | | |
|---|---|---|---|---|
| 5,672,060 A | * | 9/1997 | Poor | .......................... 434/322 |
| 6,173,154 B1 | * | 1/2001 | Kucinski et al. | ............ 434/359 |
| 6,311,040 B1 | * | 10/2001 | Kucinski et al. | ............ 434/350 |
| 6,366,760 B1 | * | 4/2002 | Kucinski et al. | ............ 434/359 |
| 2003/0224340 A1 | * | 12/2003 | Housman et al. | ........... 434/353 |

* cited by examiner

*Primary Examiner*—Monica S. Carter
*Assistant Examiner*—J. Andrew Stallard
(74) *Attorney, Agent, or Firm*—Allen, Dyer, Doppelt, Milbrath & Gilchrist, P.A.

(57) ABSTRACT

A method for improving a scoring process includes displaying an original scanned image of a hard copy page of an answer to a scorer. If the scorer determines that the image is of insufficient quality to read, an electronic request for an improved image is received from the scorer and routed electronically to an archive containing the hard copy page, from which the page is retrieved. The retrieved page is rescanned to form a new image, which is then electronically transmitted to the scorer for scoring. A system includes hardware and software elements, including a processor and a database accessible by the processor containing original scanned images of answer pages. A scorer display and an input device are located at a scoring site, and an archive display and a scanner at an archive site. Software as described above is resident on the processor for implementing the method steps.

14 Claims, 8 Drawing Sheets

ELECTRONIC TEST ANSWER RECORD IMAGE QUALITY IMPROVEMENT SYSTEM AND METHOD

BACKGROUND OF THE INVENTION

1. Field of the Invention

The present invention relates to systems and methods for scoring test answers from optical images of answer pages, and, more particularly, to systems and methods for improving a work flow for such scoring applications.

2. Description of Related Art

The automation of test scoring is a complex problem that has brought to bear significant economic pressure to optimize efficiency and accuracy and to minimize human involvement.

The scanning and data collection from test answer sheets by visual imaging means is also known in the art, for example, in commonly owned U.S. Pat. Nos. 6,173,154, 6,311,040, and 6,366,760, the disclosures of which are incorporated hereinto by reference. These patents teach a combination of OMR and visual imaging for capturing a full visual image of each answer page containing an answer to an open-ended question.

When large numbers of tests are to be graded at a scoring center, typically groups of physical test booklets are retained together based upon a particular criterion, such as individual grade levels from a particular school or school district, and a predetermined number are placed on a cart. Each test booklet is separated into individual answer sheets, and the cart is moved to a scanning area. The individual answer sheets are then sent through a scanner, which creates a scanner output record for each test booklet. The record contains such data as identifier information and test answer data gleaned from the answer sheets.

The complete system includes integrated hardware elements and software applications for capturing optical mark and full visual images of an answer page, for storing the images, for retrieving the images, for distributing the visual images to a reader for scoring, for assisting the reader in scoring, and for monitoring the reader's performance.

The scanning system comprises means for sequentially advancing each page of a plurality of answer pages along a predetermined path. Positioned along the path are mark imaging means (OMR, optical mark recognition; OCR, optical character recognition) for capturing a location of an optical mark on each answer page and visual imaging means for capturing a full visual image of each answer page. A forms database in a server is provided that contains data on the physical location and type (e.g., multiple-choice or open-ended) of each answer on each page. Software means resident in the server operate with the forms database to determine whether the captured image contains an answer to an open-ended question. If such an open-ended answer is supposed to be found on the page being imaged, the full visual image of the page is stored.

At present, if a scorer receives an optical image of an answer page that is of insufficient quality to be read, the physical answer page must be requested from storage. Then the physical answer page is distributed to the scorer for scoring. If a particular answer booklet contains more than one page having insufficient image quality, each request for a page is handled separately, meaning that the same booklet is the subject of multiple search efforts. Typically, the cart of physical test booklets will by this time have been removed from the scanning area and archived. Clearly the handling of such multiple requests disturbs scoring work flow. Further, frequently the scoring customer will have requested image data along with the assigned scores. If any of these answer page images is of poor quality, the customer cannot adequately review the scored answer.

In order to present the problem addressed by the present invention in detail, FIGS. 1A–1D are presented detailing the method steps currently known in the art to be performed to provide a readable answer page to a scorer. In the prior art method 100, if a scorer receives a poor-quality image of an answer page to be scored at a scoring site (block 101), the scorer transmits a request up the management chain for a readable copy of the answer page. Such a request is routed to a scoring support area (block 102), and scoring on the batch from which the answer page came is halted (block 103). A report containing the request is printed (block 104), and the physical report is routed to an archiving center (block 105), where the physical booklet containing the answer page is retrieved (block 106). A photocopy of the answer page is made and sent to a scoring storeroom (block 107), where the copy is matched with the request report (block 108).

At the scoring storeroom, the hard copy is checked for acceptable quality (block 109). If the hard copy still has problems, it is sent to an "alert" center, the responsibility of which is to research and repair answer booklets (block 110). The repaired booklets are then compiled (block 111), and the booklets are returned to the storeroom (block 112).

If the hard copy is acceptable, it is routed from the storeroom to the scoring center and delivered to the scorer (block 113). The scorer assigns a score using the hard copy (block 114), and the hard copy is returned to the storeroom (block 115), where it is retained until scoring on that batch is complete (block 116).

If the answer page belongs to a booklet that has been repaired (block 117), the repaired booklet is transmitted to the alert center (block 118). If electronic images have been requested by the customer (block 119), the hard copy of the answer page is transmitted to a scanning center (block 122), where all documents are re-scanned (block 123). The original images are manually deleted from the database (block 124), and an image index is manually re-created (block 125), and the new images are imported into the database (block 126). The hard copy is then returned to the storeroom (block 120) and from there to the archive center (block 121), and the process is complete.

If the answer page belongs to a booklet that has not been repaired (block 117), or if electronic images have not been requested (block 119), then, as above, the hard copy is returned to the storeroom (block 120) and from there to the archive center (block 121), and the process is complete.

It can be seen that six different locations are involved in this process: the scoring center, the scanning support center, the archive center, the storeroom, the scanning center, and the alerts center. Further, a hard copy of the problem answer page has to be physically routed through all these centers. This is clearly a labor- and time-intensive process that can cause significant delays in completing a scoring project.

SUMMARY OF THE INVENTION

The present invention is directed to a method for improving a scoring process, particularly a scoring of images of open-ended questions, although this is not intended as a limitation. The method comprises the steps of displaying an original scanned image of a hard copy page of an answer to a scorer. If the scorer determines that the image is of insufficient quality to read, an electronic request for an improved image is received from the scorer.

The request is routed electronically to an archive containing the hard copy page, from which the hard copy page is retrieved. The retrieved hard copy page is rescanned to form a new scanned image, which is then electronically transmitted to the scorer for scoring.

The present invention is also directed to a software application comprising code segments for performing the method steps outlined above.

The system of the present invention comprises hardware and software elements for carrying out the method steps outlined above. In particular, the system comprises a processor and a database accessible by the processor containing original scanned images of answer pages. A scorer display is located at a scoring site, and an archive display at an archive site, both in signal communication with the processor. An input device is also located at the scoring site and is in signal communication with the processor. A scanner is located at an archive site and is also in electronic communication with the processor. Software as described above is resident on the processor for implementing the method steps outlined above.

This system, software application, and method have been found beneficial, since improved images can be routed to a scorer in less time and with much less human intervention than by other means known in the art. Further, multiple requests for new images from the same answer booklet can be handled expeditiously. In addition, since new images are integrated directly into the database, the step of providing customers with electronic images of the answer booklets is not delayed by the presence of one or more answer booklets of insufficient quality to read.

DETAILED DESCRIPTION OF THE PREFERRED EMBODIMENTS

Figure 1A:
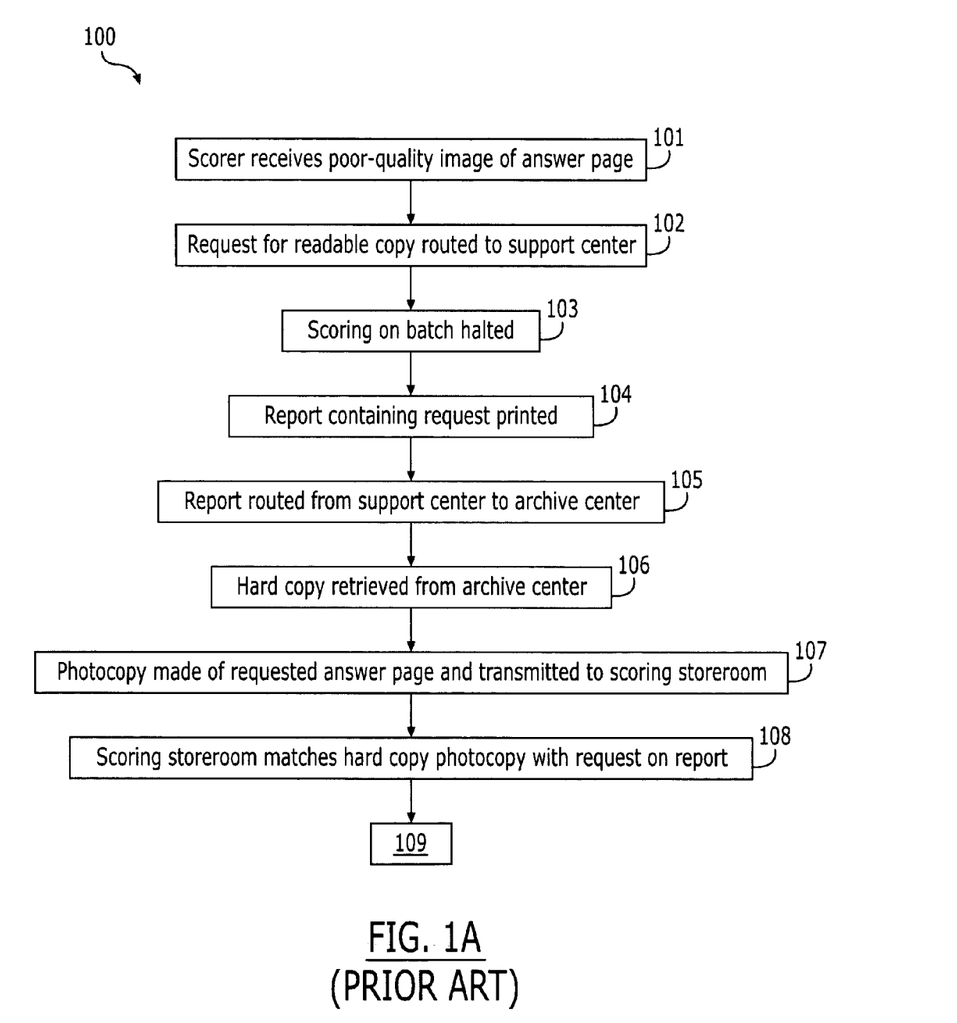
FIGS. 1A–1D (prior art) is a flow diagram of a currently used method for providing a readable answer sheet to a scorer.
Figure 1B:
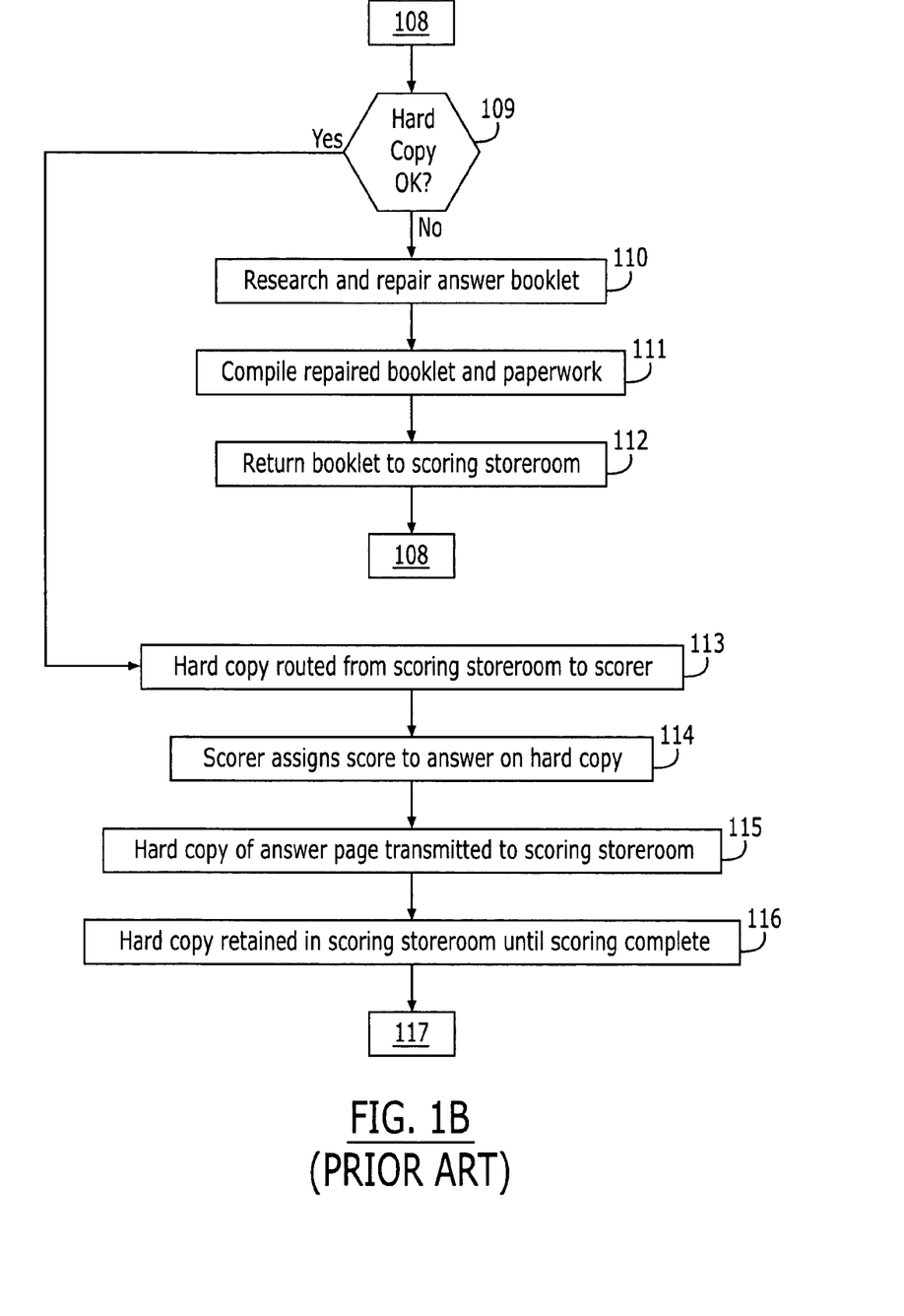
Figure 1C:
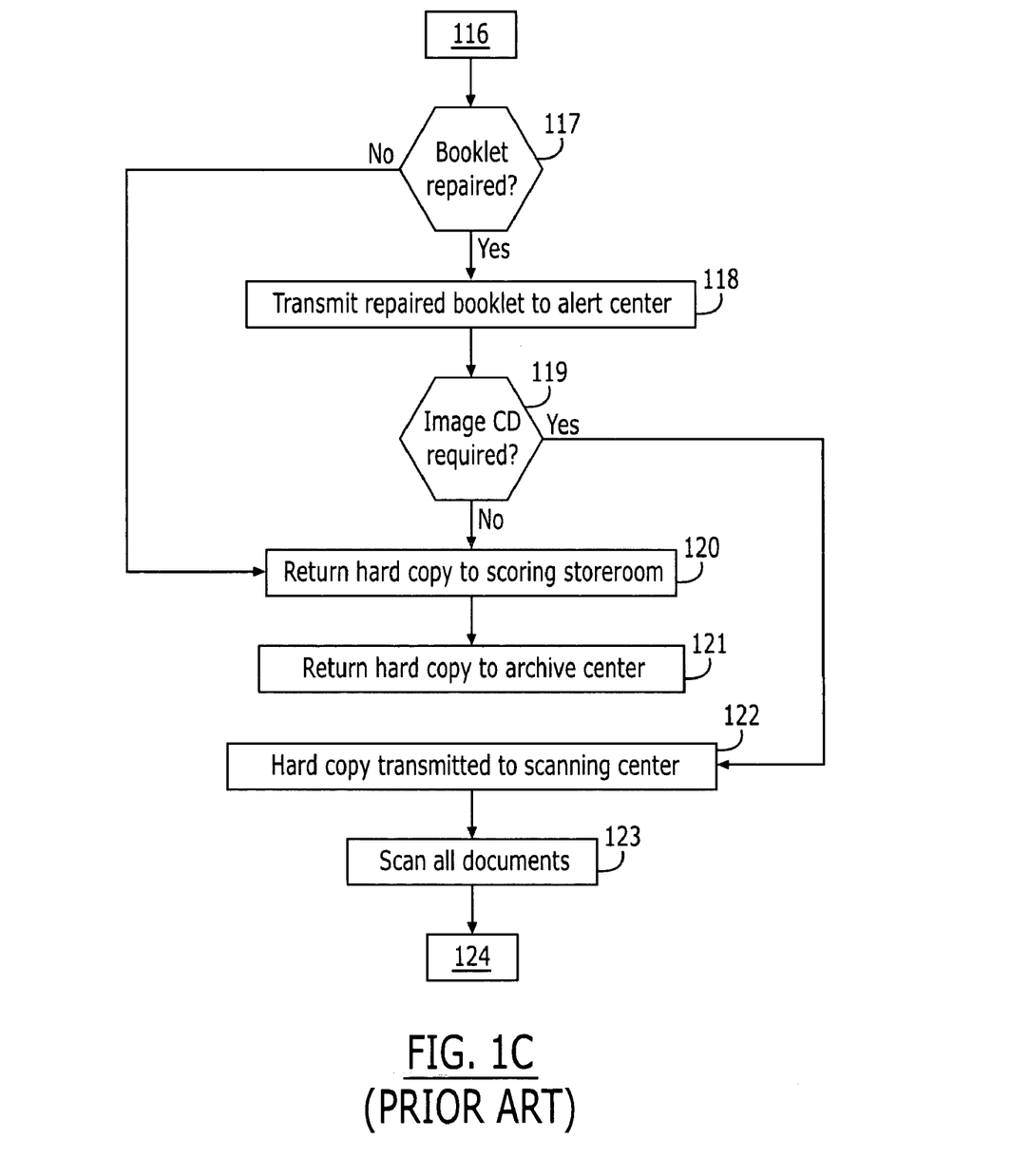
Figure 1D:
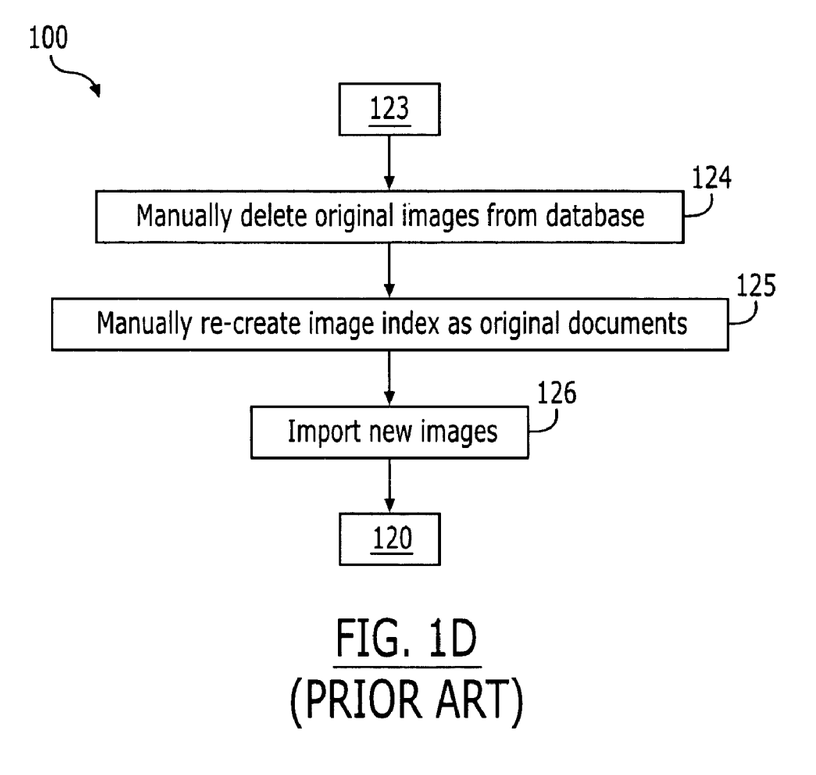
Figure 2A:
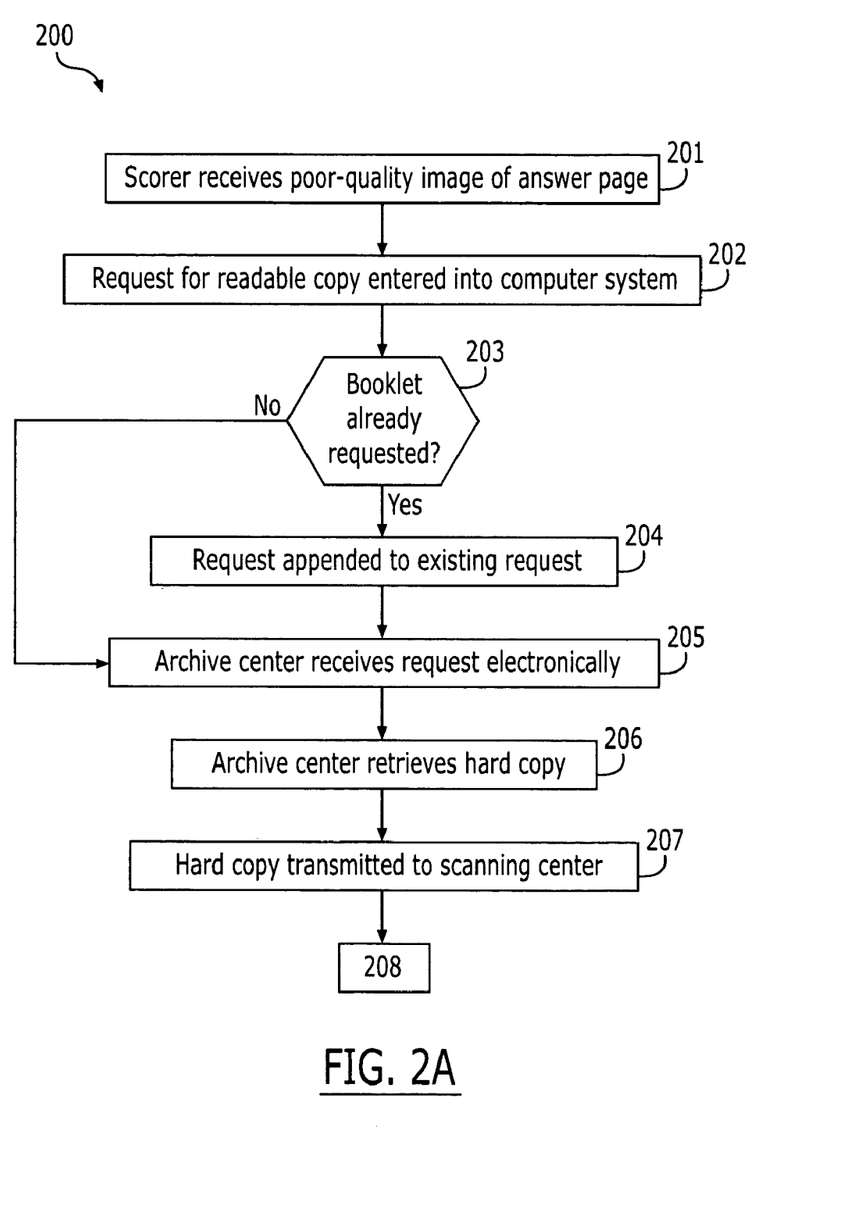
FIGS. 2A–2C is a flow diagram of the present method for providing a readable answer sheet to a scorer.
Figure 2B:
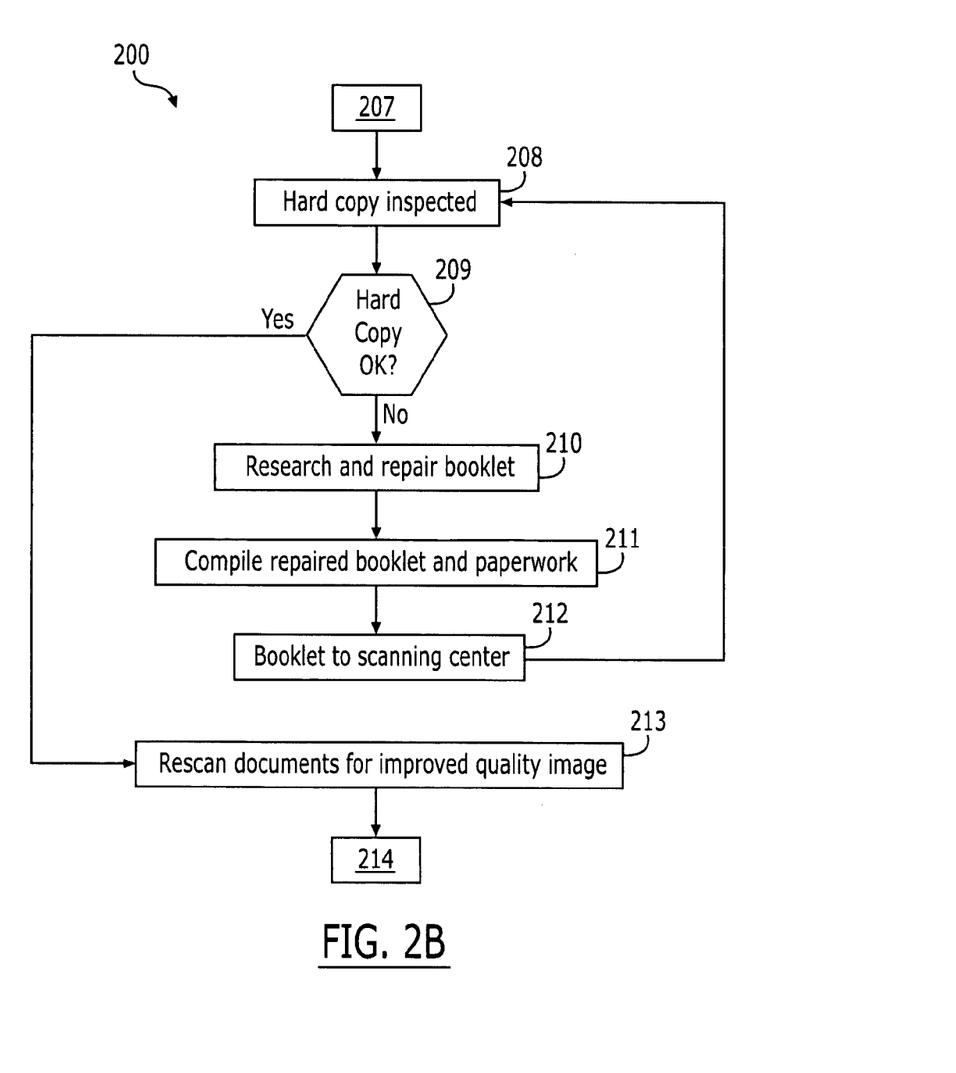
Figure 2C:
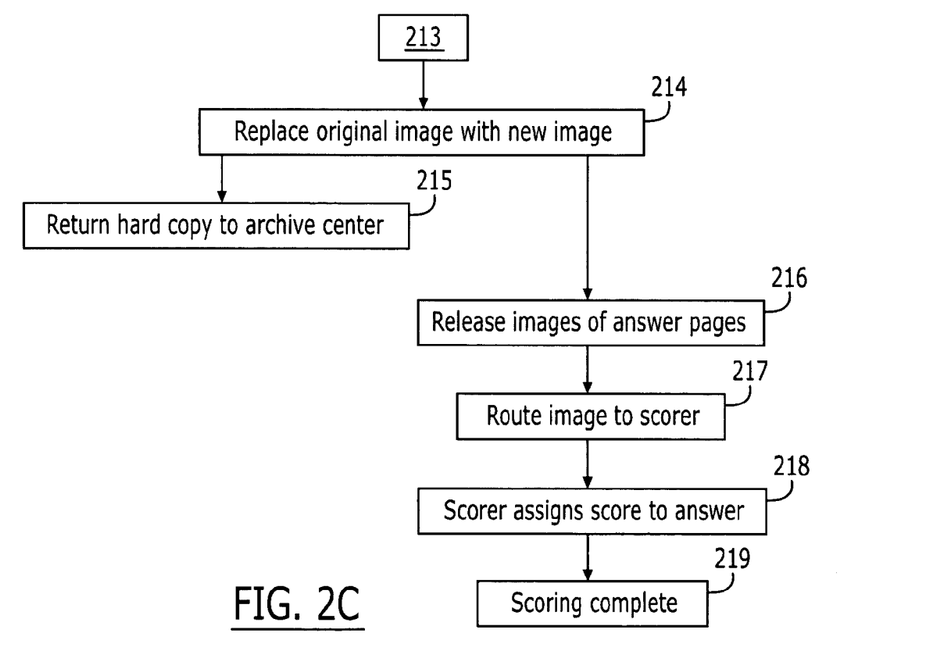
Figure 3:
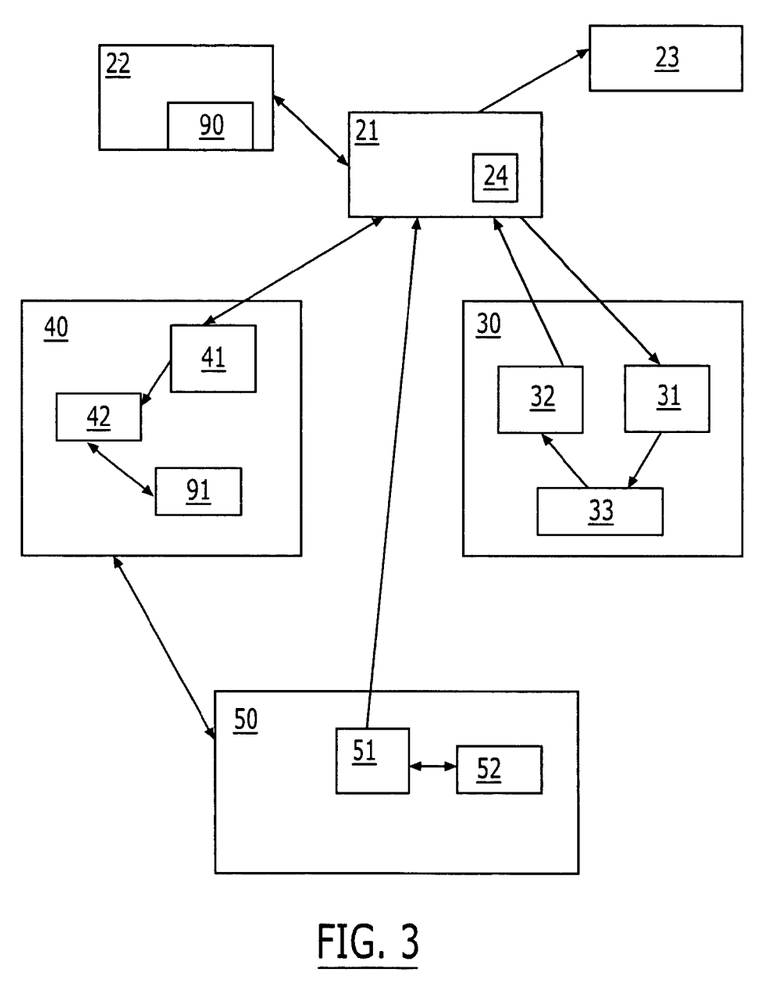
FIG. 3 is an exemplary system schematic for practicing the method of the present invention.

A description of the preferred embodiments of the present invention will now be presented with reference to FIGS. 2A–3. Aspects of the invention include a method 200 for improving a scoring process, a flowchart for which is illustrated in FIGS. 2A–2C, software for carrying out the method 200, and a system 10 for scoring an answer page, a schematic of which is illustrated in FIG. 3.

The method 200 includes the steps of receiving a request from a scorer for an image of an answer page to score and transmitting an original image to the scorer (block 201). If the original image is of insufficient quality to read, the scorer enters a request for a readable copy into an input device (block 202). The system checks whether the answer page belongs to a booklet for which a new image has already been requested (block 203), in which case the present request is appended to the pre-existing request (block 204). The request is then routed electronically to an archive center (block 205). The requested hard copy is retrieved from storage (block 206) and transmitted to a scanning location (block 207), where the hard copy is inspected for quality (block 208).

If the quality of the hard copy is insufficient for scoring (block 209), the booklet to which the answer page belongs is researched and repaired (block 210). The repaired booklet is compiled, attendant paperwork is prepared (block 211), and the booklet is returned to the scanning location (block 212).

When the quality of the hard copy is deemed sufficient (block 209), any requested pages from the booklet are rescanned to obtain an improved quality image (block 213). This new image is saved into the database, replacing the original, poor-quality image (block 214), and the hard copy is returned to the archive center (block 215). Thus the database is updated contemporaneously with the rescanning process, so that the electronic record is always commensurate with the material seen by the scorer. If a project customer requests electronic images of their project, the database is available for copying without additional steps to update the image set.

The new image is released (block 216), and the requested new image is electronically routed to the scorer (block 217), who can then assign a score (block 218), and continue to assign scores to a batch until the project is complete (block 219).

The system 20 components of the invention (FIG. 3) include a processor 21 and a database 22 that is accessible by the processor 21 for housing original scanned images of answer pages 90. At the scoring site 30 reside a scorer display 31 and an input device 32, such as a keyboard, mouse, or touch screen, although these are not intended as limitations, both in signal communication with the processor 21, for interaction with a scorer 33.

At an archive site 40 resides a display 41 in signal communication with the processor 21 for interaction with retrieval personnel 42. Hard copies of the answer booklets 91 are housed at the archive site 40.

At a scanning site 50 resides a scanner 51 in signal communication with the processor 21 for interaction with scanning personnel 52.

Also in signal communication with the processor 21 is an electronic medium writing device 23, such as, but not intended to be limited to, a CD writer, for making electronic copies of a selected portion of the database 22. This writing device 23 may be used, for example, if a customer desires electronic image copies as in step 119 in FIG. 1C discussed above.

Software 24 is resident on the processor 21 having code segments for directing and/or carrying out the method steps 200 above, and for interacting with the various personnel 33,43,52 carrying out the manual steps of the method.

It may be appreciated by one skilled in the art that additional embodiments may be contemplated, including analogous systems and methods for processing questionnaires.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiment thereof, and the advantageous new and useful results obtained thereby, the new and useful constructions, and reasonable mechanical equivalents thereof obvious to those skilled in the art, are set forth in the appended claims.

What is claimed is:

1. A method for improving a scoring process comprising the steps of:
   retrieving an original scanned image of a hard copy page of an answer from a database containing a plurality of scanned answer images, the hard copy page comprising one of a plurality of hard copy pages from a unitary answer booklet, original images of which also reside in the database;
   displaying the original scanned image of the hard copy page to a scorer;
   if the scorer determines that the image is of insufficient quality to read, receiving an electronic request for an improved image from the scorer;
   determining whether a request has been received for an improved image of a second hard copy page from the answer booklet;
   if a request for an improved image of a second hard copy page has been received, appending a supplemental request for an improved image of the one page to the request for an improved image of the second hard copy page;
   routing the request to an archive containing the hard copy page;
   retrieving the requested hard copy page or pages from the archive;
   rescanning the retrieved hard copy page or pages to form one or more new scanned images;
   replacing the original image or images with the new image or images in the database; and
   electronically transmitting the new image or images to the scorer for scoring.

2. The method recited in claim 1, wherein the plurality of scanned answer images belong to a unitary project, and further comprising the step, following the replacing step, of creating an electronic medium copy of the scanned answer images belonging to the project.

3. The method recited in claim 1, further comprising the step, following the rescanning step, of returning the hard copy page or pages to the archive.

4. An answer page scoring system comprising:
   a processor;
   a database accessible by the processor containing original scanned images of answer pages;
   a scorer display at a scoring site and an archive display at an archive site, both in signal communication with the processor;
   an input device at the scoring site in signal communication with the processor;
   a scanner at a scanning site in signal communication with the processor; and
   software resident on the processor having:
      a code segment for displaying an original scanned image of a hard copy page of an answer to a scorer on the scorer display, the hard copy page comprising one of a plurality of hard copy pages from a unitary answer booklet, original images of which also reside in the database;
      a code segment for receiving an electronic request for an improved image of the hard copy page from the scorer via the input device;
      a code segment for determining whether a request has been received for an improved image of a second hard copy page from the answer booklet;
      a code segment for, if a request for an improved image of a second hard copy page has been received, appending a supplemental request for an improved image of the one page to the request for an improved image of the second hard copy page;
      a code segment for routing the request to the archive display;
      a code segment for receiving from the scanner one or more new scanned images of the answer page or pages;
      a code segment for replacing the original image or images with the new image or images in the database; and
      a code segment for transmitting the new scanned image or images to the scorer display.

5. The system recited in claim 4, further comprising an electronic medium writing device in signal communication with the processor, and wherein:
   the plurality of scanned answer images belong to a unitary project; and
   the software further has a code segment for directing a copy of the images in the unitary project to be written by the writing device.

6. A computer-readable medium encoded with computer software for controlling a scoring of scanned answer page images, the software having:
   a code segment for displaying an original scanned image of a hard copy page of an answer to a scorer, the hard copy page comprising one of a plurality of hard copy pages from a unitary answer booklet;
   a code segment for receiving an electronic request for an improved image of the image from the scorer via an input device;
   a code segment for determining whether a request has been received for an improved image of a second hard copy page from the answer booklet;
   a code segment for, if a request for an improved image of a second hard copy page has been received, appending a supplemental request for an improved image of the one page to the request for an improved image of the second hard copy page;
   a code segment for routing the request to an archive center display;
   a code segment for receiving from a scanner one or more new scanned images of the answer page;
   a code segment for transmitting the new scanned image or images to the scorer display.

7. The computer-readable medium recited in claim 6, wherein the software further has a code segment for retrieving the original scanned image or images from a database.

8. The computer-readable medium recited in claim 7, wherein the software further has a code segment for replacing the original image or images with the new image or images in the database.

9. The computer-readable medium recited in claim 6, wherein the software further has a code segment for directing a copy of a plurality of answer page images to be written on an electronic storage medium.

10. A method for improving a scoring process of a previously scanned image of a hard copy of an answer residing in a database, the hard copy page comprising one of a plurality of hard copy pages from a unitary answer booklet, original images of which also reside in the database, the image having been determined by a scorer to be of insufficient quality to score, the method comprising the steps of:

determining whether a request has been received for an improved image of a second hard copy page from the answer booklet;

if a request for an improved image of a second hard copy page has been received, appending a supplemental request for an improved image of the one page to the request for an improved image of the second hard copy page;

routing an electronic request from the scorer to an archive containing the hard copy page or pages;

retrieving the hard copy page or pages from the archive;

rescanning the retrieved hard copy page or pages to form one or more new scanned images;

replacing the previously scanned image or images with the new image or images in the database; and electronically transmitting the new image or images to the scorer for scoring.

11. The method recited in claim 10, wherein at least a subset of the scanned answer images belong to a unitary project, and further comprising the step, following the replacing step, of creating an electronic medium copy of the scanned answer images belonging to the project.

12. The method recited in claim 10, further comprising the step, following the rescanning step, of returning the hard copy page or pages to the archive.

13. A method for improving a scoring process of an original electronic image of an answer page residing in a database, the answer page comprising one of a plurality of answer pages from a unitary answer booklet, original images of which also reside in the database, the method comprising the steps of:

receiving an electronic request for an improved electronic image of a hard copy page at an archive containing the hard copy page, an original electronic image of the hard copy page having been deemed by a scorer to be of insufficient quality to score;

determining whether a request has been received for an improved image of a second hard copy page from the answer booklet;

if a request for an improved image of a second hard copy page has been received, appending a supplemental request for an improved image of the one page to the request for an improved image of the second hard copy page;

retrieving the hard copy page or pages from the archive;

rescanning the retrieved hard copy page or pages to form one or more new scanned images; and electronically transmitting the new image or images to the scorer for scoring.

14. The method recited in claim 13, further comprising the step of replacing the original electronic image or images with the new image or images in a database of scanned answer images.

* * * * *